May 17, 1960     J. MIGUEZ     2,936,898
DRYING RACK FOR DISHES AND TABLEWARE
Filed Dec. 3, 1957     2 Sheets-Sheet 1
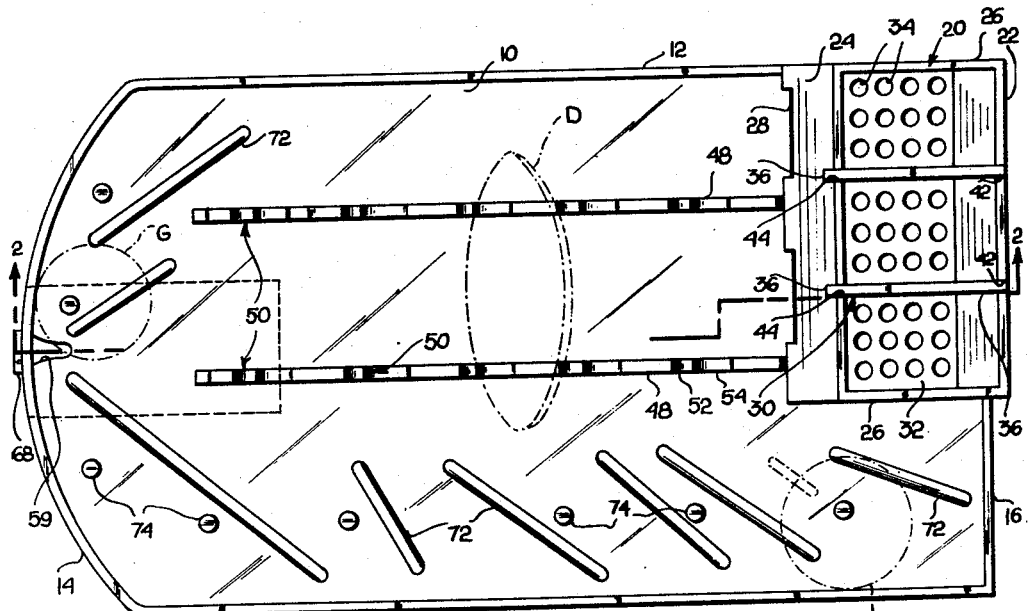
Fig. 1
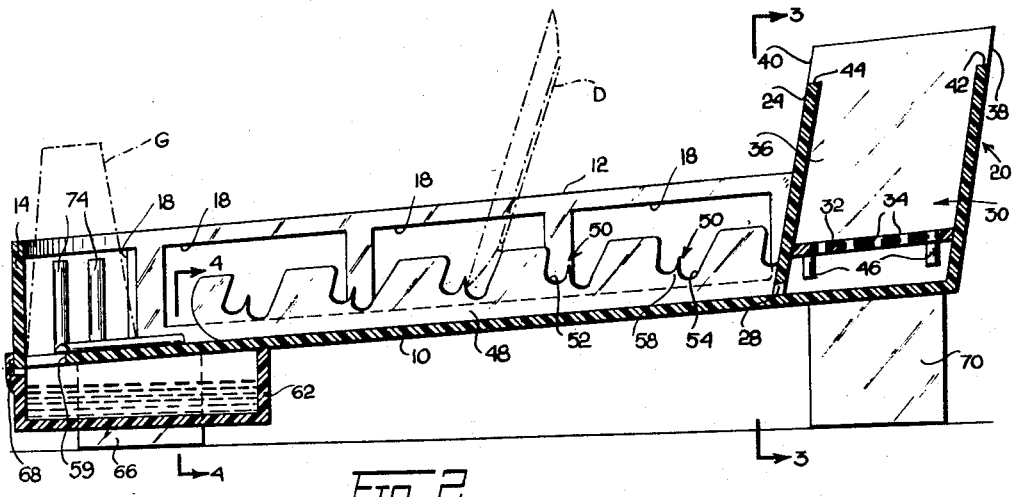
Fig. 2
INVENTOR.
JOSE MIGUEZ
BY 
ATTORNEY May 17, 1960  J. MIGUEZ  2,936,898
DRYING RACK FOR DISHES AND TABLEWARE
Filed Dec. 3, 1957  2 Sheets-Sheet 2
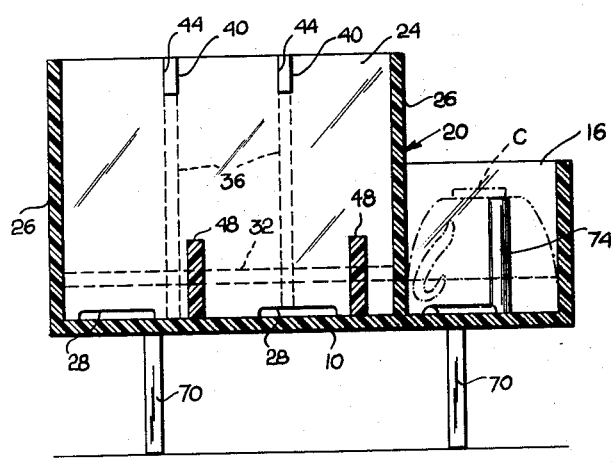
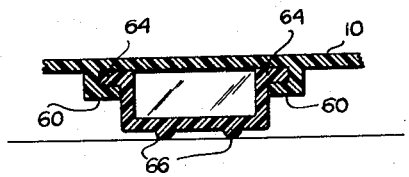
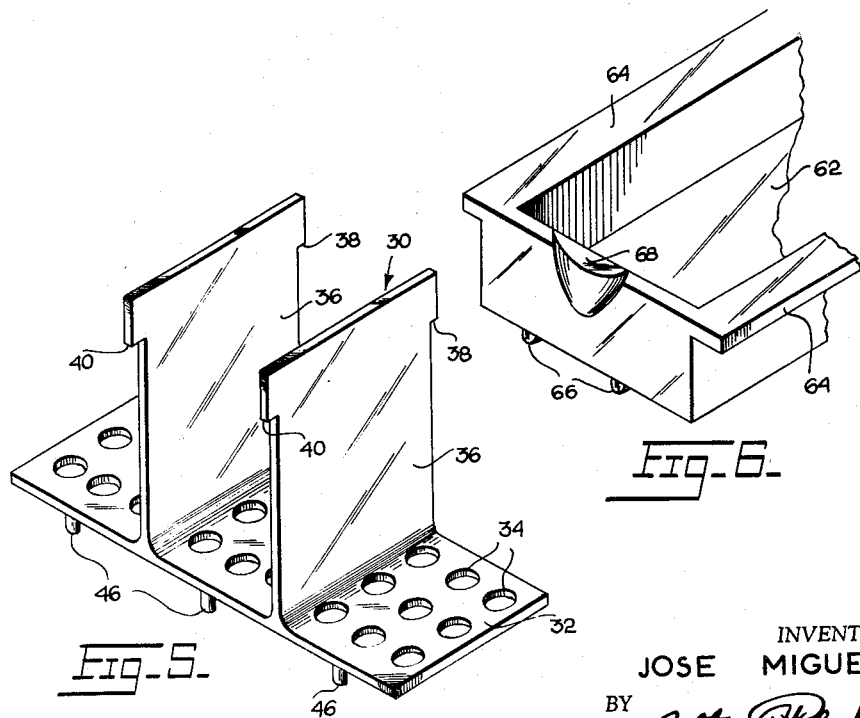
INVENTOR.
JOSE MIGUEZ
ATTORNEY United States Patent Office 2,936,898
Patented May 17, 1960

2,936,898

DRYING RACK FOR DISHES AND TABLEWARE

Jose Miguez, New York, N.Y.

Application December 3, 1957, Serial No. 700,393

1 Claim. (Cl. 211—41)

This invention relates generally to drying racks, and more particularly has reference to a rack adapted to hold a quantity of dishes, cups, glasses, silverware, etc., after the same have been rinsed and are being dried.

Most usually, a drying or drain rack of the character described must be placed upon the drain board of a sink, or directly within a sink, in view of the fact that said racks are commonly of rubber-coated wire material, with foraminous bottoms.

A disadvantage in a conventional rack is that it cannot be placed elsewhere than on a surface onto which the water can flow as it drains from the rack. In many kitchens, space is at a premium, and it is quite possible that one will not have a drain board on which the rack can be placed. Obviously, a conventional rack cannot be placed upon an adjacent kitchen table or the like, since it would not be desirable to permit the water to drain freely from the drying dishes, etc., directly onto the table.

In view of the above, it is the main object of the present invention to provide a drying rack that will be designed for use not only on a drain board of a sink, but also upon any other surface, such as the horizontal surface of a kitchen counter, kitchen table, etc.

A more particular object is to incorporate means in the drying rack to cause all the water draining from the articles to flow directly to a drain box, which can be removed whenever desired and emptied directly into the sink.

Another object is to provide a drying rack as described, which, whenever disposed upon a horizontal surface, will be so disposed as to cause all water draining from articles therein to gravitate within the rack to a single drain opening communicating with the drain box.

A further important object is to incorporate within the rack a construction such that the entire rack can be formed of molded plastic or the like.

A further object of importance is to incorporate in the rack a silverware drying means that will include an upwardly opening, tilted container designed to support the silverware in proper position for effective draining of the water therefrom.

Another object is to provide a container for silverware which will have drain openings communicating with the interior of the main or dish-receiving portion of the rack, for flow of water out of the container into said main portion.

Yet another object is to include within the silverware drying assembly a movable insert designed for supporting of silverware in different compartments, said insert being bodily removable to permit use of the silverware container for the drying of other objects, as well as silverware.

For further comprehension of the invention, and of the objects and advantages thereof, reference will be had to the following description and accompanying drawings, and to the appended claim in which the various novel features of the invention are more particularly set forth In the accompanying drawings forming a material part of this disclosure:

Fig. 1 is a top plan view of a drying rack for dishes and silverware according to the present invention.

Fig. 2 is a longitudinal sectional view substantially on line 2—2 of Fig. 1.

Fig. 3 is a transverse sectional view substantially on line 3—3 of Fig. 2.

Fig. 4 is a transverse sectional view substantially on line 4—4 of Fig. 2, showing the drain box.

Fig. 5 is an enlarged perspective view, a portion being broken away, of a partitioned, perforated support means or insert, for the silverware.

Fig. 6 is an enlarged, fragmentary perspective view of the drain box per se.

Referring to the drawings in detail, a flat, elongated bottom plate 10 of plastic or the like, which, as illustrated, may be transparent in a commercial form of the invention, is integral with a pair of side walls 12 merging at their forward ends into a forwardly, arcuately bowed front wall 14 and merging at their rear ends into a straight back wall 16, the length of which is perpendicular to the lengths of the side walls 12. The side and front walls are formed with large openings 18 (Fig. 2) through which air may circulate freely to impinge upon dishes D, glasses G, and cups C, while the same are being dried.

A silverware container generally designated 20 has a high back wall 22 constituting an upward extension of back wall 16, and high side walls 26, 26, one of which constitutes an extension in an upward direction of one of the side walls 12. Connected between side walls 26 is a front wall 24, which like the back wall is inclined slightly out of perpendicularity to the plane of the bottom plate 10.

At its lower end, front wall 24 has elongated notches 28, providing drain openings through which water draining from silverware within container 20 may flow, toward the front end of the drying rack (see Fig. 2).

An insert generally designated 30 is removably positioned within the container, and includes a rectangular, flat bottom wall 32 freely perforated as at 34. Integral or otherwise made rigid with bottom wall 32 are upstanding partitions 36, dividing container 20 into a series of compartments into which different types of silverware may be placed. Partitions 36 are each formed with rear and front projections 38, 40 fitting snugly in rear and front recesses 42, 44 of walls 22, 24, respectively. This supports the inserts within container 20, in a position such that wall 32 is elevated above bottom plate 10.

Spaced longitudinally of the wall 32 are short support legs 46 of the insert, which are adapted to support the insert when it is out of the container. When the insert is within the container, the legs 46 are spaced a short distance upwardly from the plane of the bottom plate 10.

Extending longitudinally of the bottom plate 10, and integral or otherwise made rigid with said bottom plate, are parallel, transversely spaced, identically formed dish support ribs 48. The construction of each rib is shown to its best advantage in Fig. 2. As will be noted, each rib includes a plurality of uniformly spaced, upwardly opening recesses 50. Each recess includes a front portion 52 and a back portion 54 separated by a low, upwardly projecting, pointed divider lug 58. Each recess is thus of a double formation, so as to hold one or two dishes. Portion 54 is deeper than portion 52, and both portions are inclined from the vertical as clearly shown in Fig. 2, thus to support the dishes at a corresponding angle of inclination from the vertical.

At the front end of the bottom plate, medially between the opposite sides thereof, there is a longitudinal opening 59. This is disposed with its front end terminating at the forwardmost portion of the arcuate front wall 14.

Therefore, water flowing down the plate 10 and striking the front wall will be deflected by the front wall to the opening 59, for passage through said opening.

Referring now to Fig. 4, at opposite sides of opening 59, there are confronting, longitudinal guide flanges 60, and slidably engaged with said flanges is a drain box 62, the opposite side walls of which are formed with outwardly directed flanges 64 supported upon flanges 60. At its bottom, box 62 has longitudinal support ribs 66 adapted to contact a supporting surface, such as a table.

Limiting movement of the box in a rearward direction beyond its operative position shown in Fig. 2, is a stop 68 integrally formed upon and projecting upwardly from the front wall of box 62. Stop 68 bears against the front wall 14, as shown in Fig. 2.

At the rear end of the rack, there are provided transversely spaced, vertically disposed support legs 70, the height of which is greater than that of the box. Therefore, when the rack is disposed upon a supporting surface, such as a kitchen table, said surface being horizontal, plate 10 will be inclined slightly from the horizontal. The plate will thus incline in a direction toward its forward extremity, so that all water draining from the silverware, cups, and dishes, will flow to and through drain opening 59 into box 62 to be disposed of merely by removal of the box 62. To facilitate flow of the water in the proper direction, there are provided deflector ribs 72 molded upon the top surface of plate 10 (see Fig. 1). Further, spaced along one side and across the front of the plate 10 are upwardly projecting pegs 74, on which cups and glasses may be supported in inverted position.

It will be apparent that the rack need not be used on a kitchen sink and may be placed on a kitchen table or the like, without danger of any water flowing out of the rack onto the table surface.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A drying rack for dishes and silverware comprising a bottom plate having a drain opening, a drain box on the underside of the bottom plate below said opening, means on the bottom plate for supporting a plurality of dishes, means on the bottom plate for supporting a plurality of cups and glasses, and means on the bottom plate for supporting a quantity of silverware, said silverware-supporting means comprising an upwardly opening container having front and rear walls and a silverware-supporting insert unit removably engaged in said container, said insert unit being formed with a perforated bottom elevated above the bottom of the container, and being further formed with a plurality of vertically disposed partitions, said partitions supported removably on the tops of the front and rear walls and partitioning the container into a plurality of compartments individually adapted to receive silverware, and legs depending from the perforated bottom of the insert unit.

References Cited in the file of this patent

UNITED STATES PATENTS

| | | |
|---|---|---|
| 489,190 | Groenendyke | Jan. 3, 1893 |
| 519,736 | Reid | May 15, 1894 |
| 842,703 | Roberts | Jan. 29, 1907 |
| 1,345,401 | Ratner | July 6, 1920 |
| 1,476,599 | De Witt | Dec. 4, 1923 |
| 2,645,127 | Parks | July 14, 1953 |

FOREIGN PATENTS

| | | |
|---|---|---|
| 106,034 | Great Britain | May 10, 1917 |
| 403,288 | France | Sept. 21, 1909 |
| 424,441 | Great Britain | Feb. 21, 1935 |